(12) United States Patent
Forschner et al.

(10) Patent No.: US 6,593,444 B2
(45) Date of Patent: Jul. 15, 2003

(54) THERMOPLASTIC POLYURETHANE ELASTOMERS (TPUS) PREPARED WITH POLYTRIMETHYLENE CARBONATE SOFT SEGMENT

(75) Inventors: Thomas Clayton Forschner, Richmond, TX (US); Wyndham Henry Boon, North Canton, OH (US); Aisa Sendijarevic, Troy, MI (US); Kurt Charles Frisch, deceased, late of Grosse Ile, MI (US), by Sally S. Frisch, executor; David Eric Gwyn, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/818,768

(22) Filed: Mar. 27, 2001

(65) Prior Publication Data

US 2002/0052461 A1 May 2, 2002

Related U.S. Application Data

(60) Provisional application No. 60/192,192, filed on Mar. 27, 2000, and provisional application No. 60/185,650, filed on Feb. 29, 2000.

(51) Int. Cl.[7] .................. C08G 18/44; C08G 18/65; C08G 18/32; C08G 18/18; C08G 18/22

(52) U.S. Cl. ........................ 528/85; 528/80; 528/84; 528/53; 528/54; 528/55; 528/56; 528/58

(58) Field of Search .................. 528/80, 84, 85, 528/53, 54, 55, 56, 58

(56) References Cited

U.S. PATENT DOCUMENTS

| | | | |
|---|---|---|---|
| 4,423,205 A | 12/1983 | Rajan | 528/371 |
| 4,456,745 A | 6/1984 | Rajan | 528/85 |
| 4,643,949 A | 2/1987 | Kolycheck et al. | 428/425.9 |
| 4,891,421 A | 1/1990 | Nishimura et al. | 528/370 |
| 5,133,742 A | 7/1992 | Pinchuk | 623/1 |
| 5,229,431 A | 7/1993 | Pinchuk | 521/159 |
| 5,470,608 A | 11/1995 | Watanabe et al. | 427/133 |
| 5,541,277 A * | 7/1996 | Muhlfeld et al. | 528/28 |

FOREIGN PATENT DOCUMENTS

| | | |
|---|---|---|
| DE | 4203307 C1 | 12/1992 |
| EP | 0893463 A1 | 1/1999 |
| JP | 94053794 B2 | 7/1994 |
| JP | 95107101 B2 | 11/1995 |

OTHER PUBLICATIONS

Kuran et al.; "New route to oligocarbonate diols suitable for the synthesis of polyurethane elastomers";Polymer–The Intenational Journal for the Science and Technology of Polymers; vol. 41, No. 24; Elsevier; Aug. 25, 2000; pp. 8531–8541.*

* cited by examiner

Primary Examiner—Rabon Sergent
(74) Attorney, Agent, or Firm—Donald F. Hess

(57) ABSTRACT

Disclosed is a new class of TPUs with improved properties, based on poly(1,3-propanediol carbonate) diol, using 10 to 55% hard segment concentration, and cured with a diisocyanate. The composition provides a broader range of mechanical and thermal properties for TPU formulations, including improvements in hardness, higher elasticity modulus, and improved softening temperature and coefficient of thermal expansion, in addition to improved clarity.

26 Claims, 5 Drawing Sheets

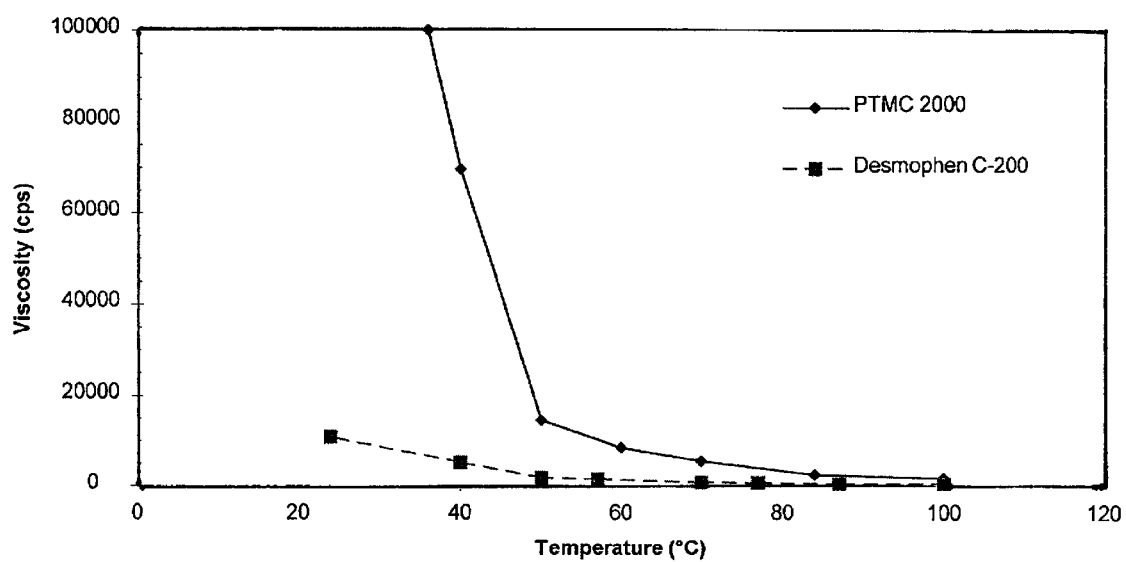
*Figure 1. Viscosity of the Polycarbonate Polyols.*

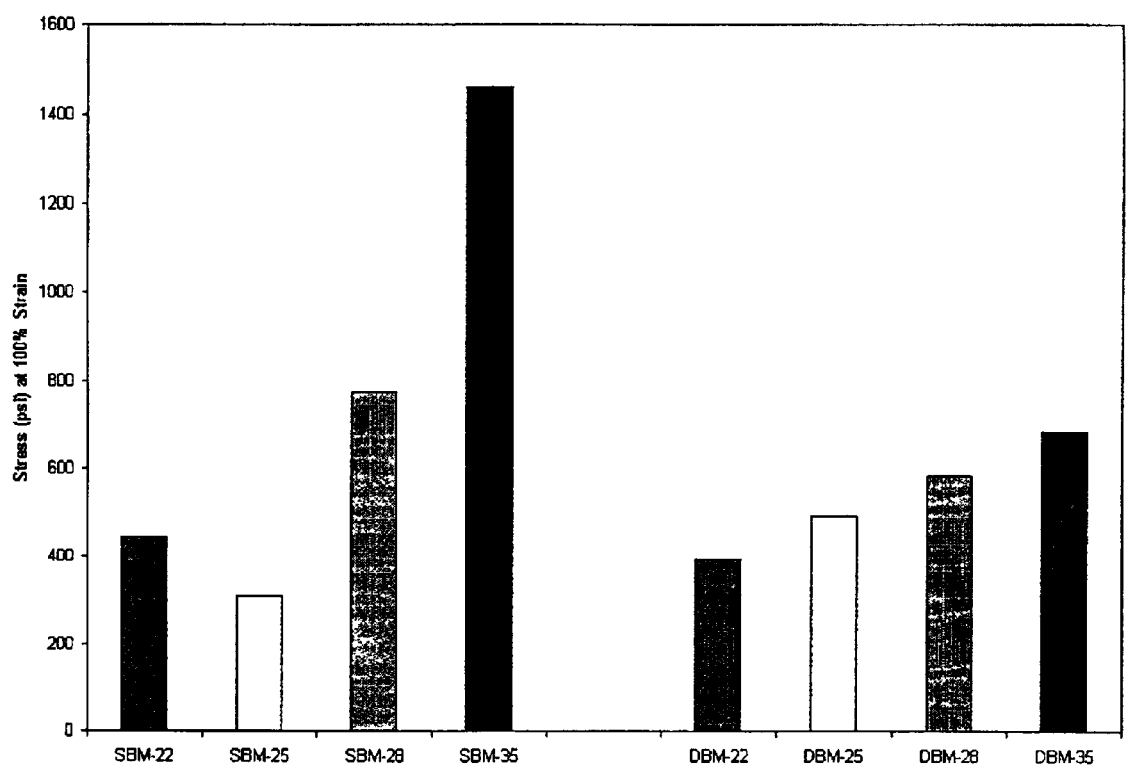
Figure 2. Stress at 100% Strain of TPUs Based on 1,4-BD.

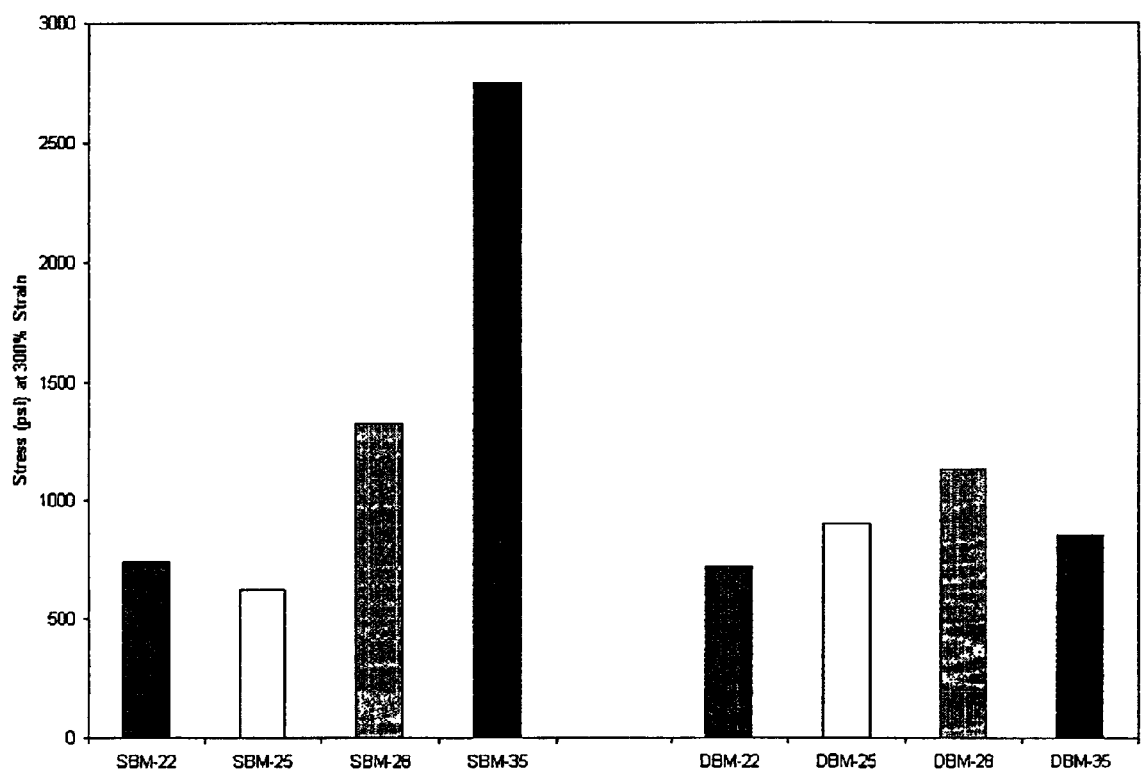
*Figure 3. Stress at 300% Strain of TPUs Based on 1,4-BD.*

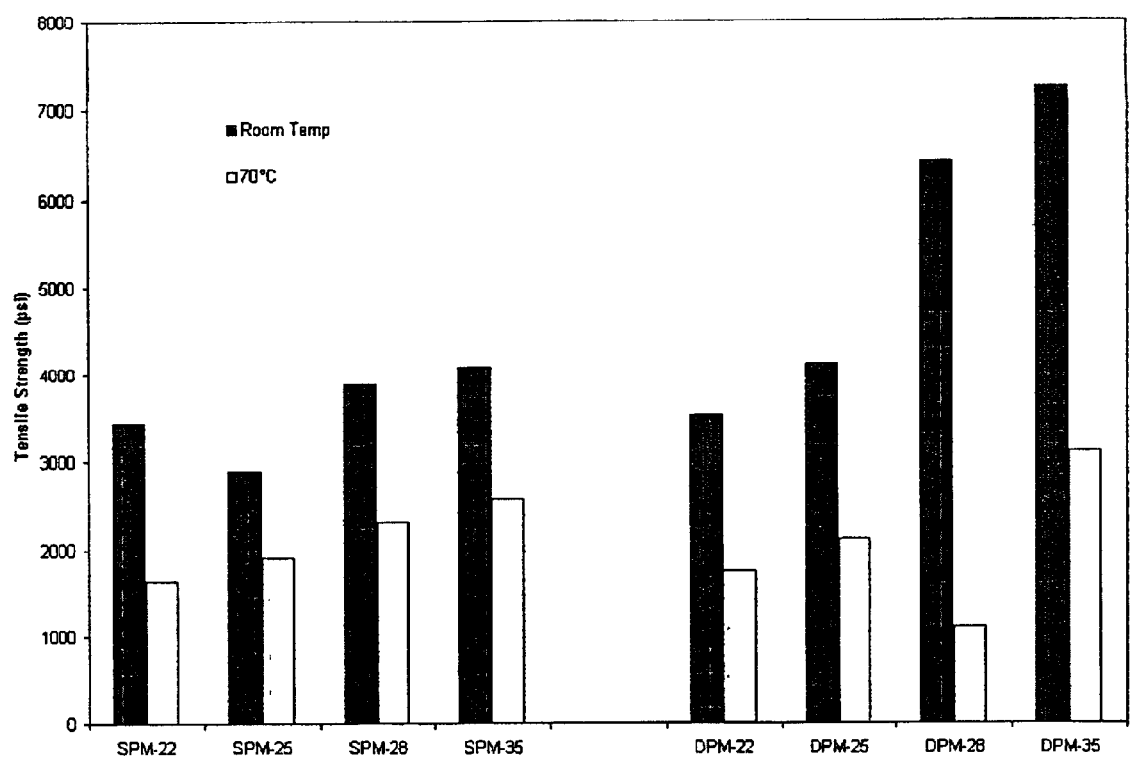
Figure 4. Tensile Strength Retention of TPUs Based on 1,3-PDO.

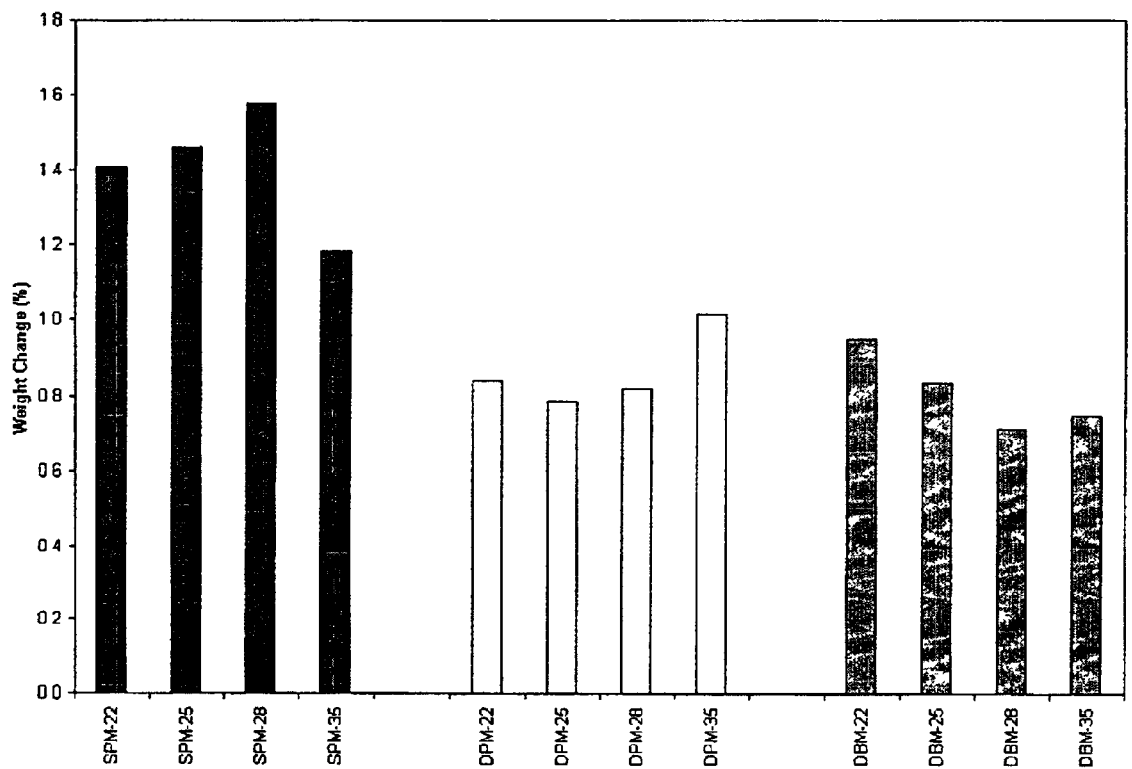
*Figure 5. Weight Change after Two-week Immersion in Water at 70°C.*

THERMOPLASTIC POLYURETHANE ELASTOMERS (TPUS) PREPARED WITH POLYTRIMETHYLENE CARBONATE SOFT SEGMENT

CROSS REFERENCE

This application claims the benefit of U.S. Provisional Application No. 60/192,192 filed Mar. 27, 2000, the entire disclosure of which is hereby incorporated by reference This application is related to U.S. Patent Application Ser. No. 60/185,650 filed Feb. 29, 2000.

FIELD OF THE INVENTION

This invention relates to thermoplastic polyurethane elastomers (Hereafter TPUs). More particularly, this invention relates to a new class of TPUs prepared with poly(trimethylene carbonate) diol (PTMC diol) as the soft segment. The TPUs prepared using PTMC diols were extended with glycols, preferably lower functionality glycols, including, for example, 1,3-propanediol and 1,4-butanediol.

BACKGROUND OF THE INVENTION

Thermoplastic polyurethane elastomers (TPU's) are of technical importance because they offer a combination of high-quality mechanical properties with the known advantages of inexpensive thermoplastic processability. Much variation in mechanical properties can be achieved by the use of different chemical components. A survey of TPU's, their properties and applications are discussed, for example in *Polyurethane Handbook,* Günter Oertel, Ed., Hanser Publishers, Munich, 1985, pp. 405–417.

TPU's are built up from linear polyols, usually polyesters or polyethers, organic diisocyanates and short-chain diols (chain extenders). The overall properties of the TPU will depend upon the type of polyol, its molecular weight, the structure of the isocyanate and of the chain extender, and the ratio of soft and hard segments.

Polyurethanes may be either thermoplastic or thermoset, depending on the degree of crosslinking present. Both thermoset and thermoplastic polyurethanes can be formed by a "one-shot" reaction between isocyanate and polyol or by a "pre-polymer" system, wherein a curative is added to the partially reacted polyol-isocyanate complex to complete the polyurethane reaction. Thermoplastic urethanes do not have primary crosslinking while thermoset polyurethanes have a varying degree of crosslinking, depending upon the functionality of the reactants.

Thermoplastic polyurethanes are commonly based on methylene diisocyanate (MDI) or toluene diisocyanate (TDI) and include both polyester and polyether grades of polyols. For adjustment of the properties, the polyols, chain extenders, and diisocyanate components can be varied within relatively wide molar ratios.

For improvement of the processing behavior, particularly in the case of products for processing by extrusion, increased stability and an adjustable melt flow are of great interest. This depends on the chemical and morphological structure of the TPU's. The structure necessary for an improved processing behavior is conventionally obtained by the use of mixtures of chain extenders, e.g. 1,4-butanediol/1,6-hexanediol. As a result of this the arrangement of the rigid segments is so greatly distorted that, not only is the melt flow improved, but simultaneously, the thermomechanical properties, e.g. tensile strength and resistance to thermal distortion, are often impaired.

The known TPUs and blends containing TPUs all suffer some drawbacks in one or more properties, including mechanical properties, color stability to heat and light, clarity, heat distortion properties, and phase separation. Attempts to improve one property, such as hardness, often lead to degeneration of another property.

Thus, problems exist in achieving hardness and related mechanical properties, stable color, clarity, and higher heat distortion temperatures in TPUs and blends containing TPUs. There is a need in the art to discover new formulations of TPUs that provide a broader range of mechanical and thermal properties without the degeneration of existing properties.

The present invention is useful in overcoming one or more problems with known thermoplastic materials by providing a new class of TPUs which provide new possibilities for mechanical and thermal properties in TPU formulations, including improvements in clarity, hardness, higher elasticity modulus, and improved softening temperature and coefficient of thermal expansion.

SUMMARY OF THE INVENTION

The present invention provides a new class of TPUs with improved properties and is based on poly(1,3-propanediol carbonate) diol (PTMC diol), with a hard segment comprising the portion of an isocyanate that reacts with a glycol plus the glycol blended into the TPU, and a diisocyanate to cure the system. The elastomers are somewhat harder than corresponding TPUs based on polyols known in the art. The PTMC TPUs exhibited good physico-mechanical properties, including somewhat higher elasticity modulus than a control TPU. The abrasion resistance and compression set was also very good, comparable to that of polyether TPUs. The softening temperature and the coefficient of thermal expansion was found to be improved over that of a control. In addition, using the PTMC polyol, it was possible to improve the clarity of the TPUs and in some examples even obtain completely clear material.

In accordance with the foregoing, the present invention comprises:

A new class of thermoplastic polyurethane elastomer (TPU) compositions which comprises:
a) A poly(trimethylene carbonate) diol (PTMC diol) as the soft segment;
b) A diisocyanate; and
c) At least one glycol (sometimes referred to as a chain extender) which reacts with the diisocyanate to form the hard segment which comprises from 10% to 55% by weight of the composition wherein the hard segment is defined as the sum portion of diisocyanate that reacts with the glycol plus the unreacted glycol.

BRIEF DESCRIPTION OF THE DRAWINGS

FIG. 1 is a graph showing the viscosity of polycarbonate polyols.

FIG. 2 is a bar graph showing stress at 100% strain of TPUs based on 1,4-BD.

FIG. 3 is a bar graph showing stress at 300% strain of TPUs based on 1,4-BD.

FIG. 4 is a bar graph showing the tensile strength retention of TPUs based on 1,3-PDO.

FIG. 5 is a bar graph showing weight change after a two-week immersion in water at 70° C.

DETAILED DESCRIPTION OF THE INVENTION

In the present invention a new class of thermoplastic polyurethanes (TPUs) was prepared using poly(trimethylene carbonate) diol as the soft segment, a hard segment containing a glycol, preferably a short chain glycol, and a diisocyanate. A suitable poly(trimethylene carbonate) glycol was prepared by a process described in a copending application described below and the specimen used in the examples of the present invention was characterized by a molecular weight of about 2000. Thermoplastic polyurethane elastomers based on the PTMC diol were evaluated for their properties.

Both aromatic and cylcoaliphatic thermoplastic polyurethane elastomers (TPUs) based on PTMC diols were prepared and evaluated. 4, 4'-Diphenylmethane diisocyanate (MDI) was utilized to prepare aromatic and methylene-bis (4-cyclohexyl isocyanate) ($H_{12}$MDI) to prepare aliphatic TPUs. The elastomers were prepared using the one shot procedure. In Examples 2, 3, 5, and 10, 1,3-propanediol (1,3-PDO) and 1,4-butanediol (1,4-BD) were used as chain extenders and the hard segment concentration was varied in the examples from 22 to 35%. For comparison, TPUs based on a commercial poly(1,6-hexanediol carbonate) glycol (Desmophen C-200, commercially available from Bayer Co.), and representative of polyols used in the art, were prepared and evaluated.

The physico-mechanical properties (hardness, stress-strain properties, tear resistance, compression set, resilience and abrasion resistance) of TPUs were measured according to ASTM standard methods. The solvent resistance (paraffin oil, ethylene glycol, and diluted acid/bases) was determined by measuring the weight change upon immersion. Water resistance was evaluated by measuring the retention of stress-strain properties and the weight change upon immersion in water at 70° C.

The morphology of the elastomers was studied by thermal analysis including differential scanning calorimetry (DSC), thermo-mechanical analysis (TMA), and dynamic-mechanical analysis (DMA), as well as Fourier transform infra-red analysis (FTIR). The elastomer transparency was also measured by determining the light transmission (%) in the visible range of 474 to 630 nanometers.

Due to the rigid nature of the PTMC diol, the elastomers exhibited relatively high $T_g$ (around 0° C.). Their hardness was somewhat higher than that of the corresponding TPUs based on, for example, Desmophen C-200, poly (tetramethyleneoxide)(PTMO) 2000 or caprolactone polyols (See Tables 17 & 18).

The PTMC 2000 TPUs exhibited good physico-mechanical properties. Their elasticity modulus was higher than Desmophen C-200 TPUs. The abrasion resistance and compression set of PTMC 2000 TPUs was very good, comparable to that of polyether TPUs.

The heat stability of PTMC 2000 TPUs, as indicated by the properties at elevated temperature, the softening temperature, and the coefficient of thermal expansion was found to be improved over that of Desmophen C-200 TPUs. By using PTMC 2000 it is possible to improve the clarity of TPUs and to even obtain completely clear material with $H_{12}$MDI.

The resistance of PTMC 2000 TPUs to oil was excellent and the resistance to other media such as diluted inorganic acids, bases, and ethylene glycol was excellent as well.

Poly (Trimethylene Carbonate) Polyols

Although higher functionality polyols can generally be used to prepare thermoset systems, the thermoplastic polyurethane elastomers (TPUs) of the present invention utilize in the examples a PTMC diol prepared in a specific manner, a glycol, and a diisocyanate. The PTMC diols were prepscribed in U.S. Patent Application Serial No. 60/185,650 filed Feb. 29, 2000, now U.S. Pat. No. 6,431,949 now Publication No. US-2002-0010308-A1, published Jan. 24, 2002, incorporated by reference herein in the entirety. The PTMC diols described therein are characterized by improvements in clarity with virtually all end groups being hydroxypropyl groups, with no measurable allyl groups. The molecular weights of the PTMC diols herein are number average molecular weights as described in the above-referenced publication in Table 2.

In order to produce poly(trimethylene carbonate) characterized by these desirable properties, trimethylene carbonate is reacted with a polyhydric alcohol in the presence of a catalyst. The polyhydric alcohol can be a diol or triol or higher polyhydric alcohol, such as, for example, propanediol and trimethylolpropane, or a mixture thereof.

The poly(trimethylene carbonate) can be prepared without a catalyst, however the catalyst provides the advantage of faster reaction times. Suitable catalysts are selected from salts of Group IA or Group IIA of the Periodic Table. Good results were obtained using sodium acetate. The Group IA or IIA catalysts are effective in small amounts, ranging from less than 1 ppm to greater than 10,000, although one would typically expect to use an amount in the range of 5 to 1000 ppm, preferably about 10 to 100 ppm, and most preferably about 10–40 ppm.

The poly(trimethylene carbonate) is preferably produced without a solvent, although a solvent could be used.

The poly(trimethylene carbonate) is produced at a temperature in the range of 50–160° C. A preferred range is from about 100–150° C., and more preferably from about 110–130° C. Pressure is not critical, and actually almost any pressure could be used, but good results were obtained using ambient pressure.

The poly(trimethylene carbonate) will have properties that are determined by several factors, the most important factors being the amount and identity of any initiating alcohol(s), catalysts and catalyst amounts, and the process conditions. A manufacturer may vary the determining factors to predictably produce the molecular weight, polydispersity, and other characteristics needed for the intended application.

In the present invention, to prepare a new class of TPUs that provides new formulation options, good results were obtained using a PTMC diol prepared as described and having a molecular weight below about 10,000, preferably from about 1000 to 3000. The TPUs in the examples herein were prepared with a PTMC diol having a molecular weight of 2000.

Glycol (Chain Extender)

The glycol component may be selected from aliphatic, alicyclic, aralkyl, and aromatic glycols. As would be known to those skilled in the art, higher functionality alcohols could be useful in many applications. In the present invention, however, good results were obtained using lower functionality glycols. Examples of glycols employed include, but are not limited to, ethylene glycol; propylene glycol; 1,3-propanediol; 2, methyl-1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6- hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; and p-xylylenediol, or mixtures thereof. Additional examples of suitable glycols include hydroxyalkyl derivatives of hydroquinone, i.e., bis 2-hydroxyethyl ether (HQEE), and hydroxyalkyl derivatives of resorcinol and bisphenol A. Examples 2, 3, 5 and 10 demonstrate the use of 1,3-propanediol and 1,4-butanediol.

The hard segment concentration is the sum of the portion of isocyanate that reacts with the glycol plus the unreacted glycol. The glycol hard segment is blended into the TPU in an amount which corresponds to 10 to 55% hard segment concentration, preferably from about 20 to 40% hard segment concentration.

Isocyanate

Isocyanates useful for curing polyurethane elastomers generally include aliphatic, aromatic or cycloaliphatic polyisocyanates. For the preparation of the TPUs of the present invention diisocyanates were employed. Suitable diisocyanates are aliphatic, aromatic or cycloaliphatic diisocyanates. An example of an aliphatic diisocyanate is hexamethylene diisocyanate. Examples of cycloaliphatic diisocyanates include isophorone diisocyanate, 1,4-cyclohexane diisocyanate, 1-methyl-2,4- and -2,6-cyclohexane diisocyanate, as well as the corresponding isomer mixtures, 4,4'-, 2,4'- and 2,2'-dicyclohexyl-methane diisocyanate, as well as the corresponding isomer mixtures. Examples of aromatic diisocyanates include 2,4-toluene diisocyanate, mixtures of 2,4- and 2,6-toluene diisocyanate, 4,4'-, 2,4'- and 2,2'-diphenylmethane diisocyanate, mixtures of 2,4'- and 4,4'-diphenylmethane diisocyanate, urethane-modified liquid 4,4'- and/or 2,4'-diphenylmethane diisocyanates, 4,4'-diisocyanatodiphenylethane-(1,2) and 1,5-naphthalene diisocyanate. Other examples of suitable diisocyanates include, but are not limited to, diphenylene-4-4'-diisocyanate, 3,3'-dimethoxy-4-4'-diphenylene diisocyanate, methylene-bis-(4-cyclohexylisocyanate), tetramethylene diisocyanate, decamethylene diisocyanate, ethylene diisocyanate, ethylidene diisocyanate, propylene-1,2-diisocyanate, cyclohexylene-1,2-diisocyanate, m-phenylene diisocyanate, p-phenylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, furfurylidene diisocyanate, xylylene diisocyanate, diphenyl propane-4,4'-diisocyanate, bis-(2-isocyanatoethyl) fumarate, naphthalene diisocyanate, and combinations thereof.

Additional diisocyanate compounds might include, for example: 1,4'-dicyclohexylmethane diisocyanate, 3-isocyanatomethyl-3,5,5-trimethylcyclohexyl isocyanate, cyclohexylene-1,4-diisocyanate, 4,4'-methylenebis(phenyl isocyanate), 2,2-diphenylpropane-4,4'-diisocyanate, p-phenylene diisocyanate, m-phenylene diisocyanate, xylene diisocyanate, 1,4-naphthalene diisocyanate, 4,4'-diphenyl diisocyanate, azobenzene-4,4'-diisocyanate, m- or p-tetramethylxylene diisocyanate and 1-chlorobenzene-2,4-diisocyanate, 1,6-hexamethylene diisocyanate, 4,6'-xylylene diisocyanate, 2,2,4-(2,4,4-)trimethylhexamethylene diisocyanate, 3,3'-dimethyldiphenyl 4,4'-diisocyanate, 3,3'-dimethyl-diphenylmethane-4,4'-diisocyanate, and the like.

The diisocyanates employed in the examples to demonstrate the benefits of the invention were 4,4'-diphenylmethane diisocyanate (MDI) and methylene-bis(4-cyclohexyl isocyanate) ($H_{12}$MDI)

Catalysts

Where a catalyst is utilized, suitable catalysts are those which accelerate the reaction between the NCO groups of the diisocyanates and the hydroxyl groups of the structural components. Examples include tertiary amines and organic metal compounds known in the art and described, for example, in U.S. Pat. No. 6,022,939, incorporated by reference herein in the entirety. Suitable compounds include, for example, triethylamine, dimethylcyclohexylamine, N-methylmorpholine, N,N'-dimethylpiperazine, 2-(dimethylaminoethoxy)ethanol, diazabicyclo(2,2,2)octane, and the like, as well as organic metal compounds such as titanic acid esters, iron compounds, and tin compounds, examples of which include tin diacetate, tin dioctoate, tin dilaurate and the tin dialkyl salts of aliphatic carboxylic acids, such as dibutyltin diacetate, dibutyltin dilaurate, and the like. The catalysts are usually used in quantities of 0.0005 to 0.5 parts per 100 parts of polyhydroxy compound.

Preparation

The TPUs of the present invention were prepared by the one shot method. In the examples hard segments were included in the PTMC polyurethanes at concentrations ranging from about 10 to 55%, preferably 20 to 40% by weight.

The isocyanate index, ratio of isocyanate to hydroxyl equivalent, depends on the isocyanate and glycol (often called the chain extender) employed. In the case of thermoset elastomers in general the index may be anywhere from about 0.105 to 600 or more. The isocyanate index in the present invention could be from about 0.8 to 1.04, depending on the formulation, but is preferably close to about 1.02.

The polyol and glycol (chain extender) were heated at a temperature from about 70 to 150° C., preferably about 95 to 140° C., and in specific examples about 100 to 135° C. Somewhat higher temperatures could be used, but, as is known in the art, are generally not recommended in order to avoid side reactions. The diisocyanate was preheated at the mixing temperature, added to the mixture of polyol and chain extender and all components were mixed vigorously for 5 to 10 seconds. The mixture was then poured in a preheated Teflon-coated mold (<150°). Gelation was determined by string formation, which generally occurred within about 10–20 seconds, and when that occurred the mold was placed in a Carver press and the resin was compression-molded at elevated pressure and moderately elevated temperature. The pressure is preferably from about 20,000 to 30,000 lbs, and a suitable temperature is from about 100° C. to 140° C. Suitable pressures can be well above or below this range, as would be known to those skilled in the art. Afterwards the polyurethane sheet was post-cured in an oven at from about 90 to 150° C., preferably about 100–140° C., for a time that may be from several hours to several days, depending upon the temperature.

The following examples will serve to illustrate specific embodiments of the invention disclosed herein. These examples are intended only as a means of illustration and should not be construed as limiting the scope of the invention in any way. Those skilled in the art will recognize many variations that may be made without departing from the spirit of the disclosed invention.

Experimental

The materials utilized in the examples are shown in Table 1. The isocyanates were used as received from the suppliers. The NCO % concentration was checked by titration butylamine method of ASTM D1638-74. The hydroxyl number of the polyols was determined by using the standard phthalic anhydride esterification method (ASTM D4273).

TABLE 1

Raw Materials

| Material | Chemical Identification | Eq. Wt. | Supplier |
|---|---|---|---|
| Diol | | | |
| PTMC 2000 (24288-96) | Poly(1,3-propanediol carbonate) glycol | 865.50 | Shell Chem. Co. |
| PTMC 2000 (24617-12B) | Poly(1,3-propanediol carbonate) glycol | 905.00 | Shell Chem. Co. |
| Desmophen C-200 | Poly(1,6-hexanediol carbonate) glycol | 1000.00 | Bayer Corp. |
| Chain Extender (Glycol) | | | |
| 1,3-PDO | 1,3-Propanediol | 38.00 | Shell Chem. Co. |
| 1,4-BD | 1,4-Butanediol | 45.00 | BASF |
| Diisocyanate | | | |
| Desmodur M | Methylene 4,4'-bis(diphenyl diisocyanate) | 125.00 | Bayer Corp. |
| Desmodur W | Methylene 4,4'-bis(cyclohexyl isocyanate) | 132.00 | Bayer Corp. |

EXAMPLE 1

In Example 1 the viscosity of the polyols was tested. The viscosity of PTMC 2000 at room temperature was found to be much higher than that of Desmophen C-200, which is due to the higher concentration of stiff carbonate groups in PTMC 2000 (Table 2, FIG. 1). The viscosity was significantly decreased by temperature. Due to the shorter hydrocarbon sequence (three $CH_2$ groups) the glass transition temperature of PTMC 2000 was found to be −28.5° C., significantly higher than that of Desmophen C-200, which has six $CH_2$ groups (−58.3° C.).

TABLE 2

Viscosity of the Polycarbonate Polyols

| Temperature (° C.) | Viscosity (cps) | |
|---|---|---|
| | PTMC 2000 | Desmophen c-200 |
| 100 | 1750 | 400 |
| 87 | | 490 |
| 84 | 2500 | |
| 77 | | 660 |
| 70 | 5450 | 750 |
| 60 | 8600 | |
| 57 | | 1430 |
| 50 | 14600 | 1860 |
| 40 | 69500 | 5250 |
| 36 | >100000 | |
| 24 | | 10900 |

EXAMPLE 2

In Example 2 the compatibility of the chain extenders with the polyols was examined. The compatibility of PTMC 2000 with chain extenders (1,4-ED and 1,3-PDO) was studied by mixing components at specified ratios at different temperatures. Visual observation of the mixtures was recorded. Different % concentrations of chain extenders were examined in the control polyol and the PTMC 2000 at room temperature, 70° C., and 90° C. PTMC 2000 was compatible with 1,4-butanediol (1,4-BD) and 1,3-propanediol (1,3-PDO) from room temperature to 90° C. (Table 3). In this evaluation the weight ratio of polyol to chain extender corresponds to elastomers with hard segment concentrations of 22 to 35%. The compatibility of Desmophen C-200 with chain extenders at room temperature was limited. The results are shown in Table 3:

TABLE 3

The Compatibility of Polycarbonate Diols with the Chain Extenders

| % H. S. | 22 | | | 25 | | | 28 | | | 35 | | |
|---|---|---|---|---|---|---|---|---|---|---|---|---|
| Temperature (° C.) | RT | 70 | 90 | RT | 70 | 90 | RT | 70 | 90 | RT | 70 | 90 |
| 1,3-PDO | | | | | | | | | | | | |
| PTMC 2000 | C | C | C | C | C | C | C | C | C | C | C | C |
| Desmophen C-200 | PC | C | C | PC | C | C | PC | C | C | NC | C | C |
| 1,4-BD | | | | | | | | | | | | |
| PTMC 2000 | C | C | C | C | C | C | C | C | C | C | C | C |
| Desmophen C-200 | PC | C | C | PC | C | C | PC | C | C | NC | C | C |

C = Compatible; PC = Partially Compatible; NC = No Compatibility

EXAMPLE 3

In Example 3 TPUs were prepared by the one-shot method at hard segment concentrations of 22, 25, 28, and 35%. Prior to elastomer preparation polyols and chain extenders were vacuum dried at 70° C. for at least 24 hours. The diisocyanates were used as received from the suppliers. The NCO % was checked by titration by the di-n-butylamine method (ASTM D1638-74). The isocyanate index (isocyanate to hydroxyl equivalent ratio) was 1.02. Polyol and chain extender were weighed in a plastic cup and heated at 100° C. or 135° C. Benzoyl chloride was added to the mixture of polyol and chain extender. Diisocyanate, which was previously heated at the mixing temperature, was added to the mixture of polyol and chain extender and all components were mixed vigorously for 5–10 seconds. The mixture was then poured into a Teflon-coated mold, which was preheated at 105° C. or 135° C. When gelation occurred (as determined by string formation), the mold was placed in a Carver press and the resin was compression-molded at 24,000 lbs at 105° C. or 135° C. Afterwards, the polyurethane sheet was post-cured in an oven at 105° C. or 135° C. for 24 hours (or 135° C. for 20 hours and 150° C. for 4 hours). Post-curing is not always necessary. The curing and postcuring conditions in the preparation of aromatic TPUs are shown in Table 4 and for the aliphatic TPUs in Tables 13 and 14. The polyurethane elastomers were tested one week after preparation.

TABLE 4

Curing and Post-Curing Conditions in the Preparation of MDI-TPUs

|  | PTMC 2000 | Desmophen C-200 |
|---|---|---|
| Mixing Conditions | 135° C. for 10 sec. 2 drops Benzoyl Chloride (1 4-BD) 4 drops Benzoyl Chloride (1,3-PBD) | 105° C. for 5 sec. |
| Curing Conditions | 135° C. for 1 hr (pressed at 24000 lbs) | 105° C. for 1 hr (pressed at 24000 lbs) |
| Post-curing Conditions | 135° C. for 20 hrs (1,4-BD) 135° C. for 20 hrs 150° C. for 4 hrs (1,3-PDO) | 105° C. for 24 hrs |

EXAMPLE 4

In Example 4, the formulations and properties of MDI-based TPUs based on PTMC 2000 and Desmophen C-2000 extended with 1,3-PDO were tested.
The data are shown in Tables 5 and 6. Increasing the hard segment concentration from 22 to 35% resulted in the hardness of PTMC 2000 TPUs increasing from 73 to 91 Shore A. The hardness of Desmophen C-200 TPUs was somewhat lower at the same hard segment concentration. In general, the tensile strength, elasticity modulus and Die C tear resistance of TPUs increased with the hard segment concentration as expected. The abrasion resistance of PTMC 2000 elastomers was very good, better than that obtained for Desmophen C-200. This could possibly be due to the reinforcing effect of hydrogen bonds in PTMC 2000 polyurethanes, which contain a high proportion of carbonate groups capable of forming hydrogen bonds. The abrasion resistance of PTMC 2000 TPUs was similar to or even better than that of PTMO 2000 and TONE polycaprolactone TPUs. Some examples of PTMO 2000 TPUs have abrasion resistance indices of, for example, 13 and 20. See Tables 6-A, 17, and 18, which contain data regarding properties of TPUs based on commercial polyols.

PTMC TPUs demonstrated relatively low compression set (4 to 7%), lower than that of Desmophen C-200 TPUs (14.3 to 23.5%). It is interesting to note that the resilience of 1,3-PDO extended polycarbonate TPUs increased with increase of the hard segment concentration.

TABLE 5

Physico-Mechanical Properties of TPUs Based on PTMC 2000/1,3-PDO/MDI

|  |  | SPM-22 | SPM-25 | SPM-28 | SPM-35 |
|---|---|---|---|---|---|
| Hardness Properties at RT | (Shore A) | 73 | 83 | 88 | 91 |
| Tensile Strength | (psi) | 3440.00 | 2895.00 | 3885.00 | 4091.00 |
| Elongation | (%) | 738.20 | 560.60 | 566.80 | 425.90 |
| Young's Modulus | (psi) | 823.30 | 1331.00 | 2755.00 | 17020.00 |
| Stress (100% Strain) | (psi) | 489.10 | 751.90 | 1066.00 | 1590.00 |
| Stress (300% Strain) | (psi) | 1056.00 | 1436.00 | 1925.00 | 2771.00 |
| Toughness |  | 10940.00 | 8116.00 | 11330.00 | 9970.00 |
| Properties at 70° C. |  |  |  |  |  |
| Tensile Strength | (psi) | 1621.00 | 1910.00 | 2313.00 | 2574.00 |
| (% Change) |  | (−53) | (−34) | (−40) | (−37) |
| Elongation | (%) | 1039.00 | 777.00 | 873.30 | 741.70 |
| Young's Modulus | (psi) | 989.30 | 1822.00 | 2168.00 | 6072.00 |
| Stress (100% Strain) | (psi) | 327.10 | 482.50 | 523.30 | 894.90 |
| Stress (300% Strain) | (psi) | 491.70 | 773.30 | 874.80 | 1311.00 |
| Toughness |  | 9027.00 | 10470.00 | 10520.00 | 11240.00 |
| Other Properties at RT |  |  |  |  |  |
| Split Tear | (lbs/in) | 83.94 | 104.70 | 88.01 | 223.10 |
| Tear Resistance, Die C | (lbs/in) | 378.50 | 429.90 | 539.10 | 719.60 |
| Abrasion* | (mg loss) | 2 | 7 | 4 | 1 |
| Resilience | (%) | 6 | 9 | 12 | 19 |
| Compression Set At 70° C. | (%) | 4.00 | 6.00 | 4.30 | 7.60 |

*4000 cycles, 500 gr, H22 Wheel

TABLE 6

Physico-Mechanical Properties of TPUs Based on Desmophen C-200/1,3-PDO/MDI

|  |  | DPM-22 | DPM-25 | DPM-28 | DPM-35 |
|---|---|---|---|---|---|
| Hardness Properties at RT | (Shore A) | 64 | 70 | 78 | 82 |
| Tensile Strength | (psi) | 3535.00 | 4116.00 | 6419.00 | 7246.00 |
| Elongation | (%) | 838.00 | 887.00 | 899.00 | 741.00 |
| Young's Modulus | (psi) | 794.00 | 729.00 | 1283.00 | 1411.00 |
| Stress (100% Strain) | (psi) | 380.00 | 493.70 | 566.30 | 1034.00 |
| Stress (300% Strain) | (psi) | 717.30 | 964.70 | 1170.00 | 2218.00 |
| Toughness |  | 10900.00 | 14610.00 | 23420.00 | 24110.00 |

TABLE 6-continued

Physico-Mechanical Properties of TPUs Based on Desmophen C-200/1,3-PDO/MDI

|  |  | DPM-22 | DPM-25 | DPM-28 | DPM-35 |
|---|---|---|---|---|---|
| Properties at 70° C. | | | | | |
| Tensile Strength | (psi) | 1737.00 | 2105.00 | 1094.00 | 3101.00 |
| (% Change) | | (−51) | (−49) | (−83) | (−57) |
| Elongation | (%) | 989.00 | 915.30 | 498.20 | 736.20 |
| Young's Modulus | (psi) | 579.60 | 10680.00 | 9180.00 | 2412.00 |
| Stress (100% Strain) | (psi) | 318.10 | 393.30 | 410.00 | 805.70 |
| Stress (300% Strain) | (psi) | 545.40 | 678.50 | 682.20 | 1268.00 |
| Toughness | | 8463.00 | 9902.00 | 3349.00 | 12230.00 |
| Other Properties at RT | | | | | |
| Split Tear | (lbs/in) | 210.00 | 126.00 | 155.00 | 238.00 |
| Tear Resistance, Die C | (lbs/in) | 296.00 | 344.00 | 417.00 | 578.00 |
| Abrasion* | (mg loss) | 43 | 201 | 69 | 199 |
| Resilience | (%) | 51 | 45 | 44 | 36 |
| Compression Set At 70° C. | (%) | 14.30 | 9.50 | 10.20 | 23.50 |

*4000 cycles, 500 gr, H22 Wheel

TABLE 6-A

Properties of TPUs Based on Commercial Polyols*

|  |  | 1 | 2 | 3 | 4 |
|---|---|---|---|---|---|
| Formulation | | | | | |
| Tone | | 54.51 | 49.30 | | |
| PTMO 2000 | | | | 96.52 | 97.04 |
| 1,3 - PDO | | 1.94 | | | 3.63 |
| 1,4 - BD | | | 1.99 | 4.28 | |
| MDI | | 13.38 | 11.94 | 24.20 | 24.33 |
| Hard Segment | (%) | 22 | 22 | 22.8 | 22.4 |
| Hardness | (Shore A) | 58.8 | 58.2 | 73 | 71 |
| Properties at RT | | | | | |
| Tensile Strength | (psi) | 4253.00 | 4103.00 | 4600.00 | 4540.00 |
| Elongation | (%) | 1048.00 | 1074.00 | 1060.00 | 1080.00 |
| Young's Modulus | (psi) | | | 1040.00 | 985.00 |
| Split Tear | (lbs/in) | | | 133.00 | 122.00 |
| Tear Resistance, Die C | (lbs/in) | 383.20 | 368.60 | 321.00 | 322.00 |
| Taber Abrasion | | 3.5 | 3 | 13 | 20 |
| Res. Index | (%) | | | 64 | 63 |
| | (%) | | | 12.10 | 10.60 |
| Resilience | (° C.) | −42.81 | −44.07 | | |
| Compression Set At 70° C. | | | | | |
| $T_g$ by DSC | | | | | |

*Evaluation of 1,3-Propanediol (PDO) in Polyurethane Applications. Phase I: Polyurethane Elastomers, P. Jackson, J. Wang, A Sendijarevic, and K. C. Frisch, 1996.

EXAMPLE 5

In Example 5 PTMC TPUs were prepared with 1,4-BD chain extender at a hardness range from 22 to 35P and examined for various properties. Data are shown in Tables 7 and 8. The strength properties (tensile strength, 1000 and 3006 elasticity modulus, Young's modulus and toughness) and Die C tear strength of PTMC 2000 and Desmophen C-200 TPUs changed quite uniformly with increase in the hard segment concentration. The tensile strength of the PTMC-TPUs was found to be somewhat lower compared to Desmophen C-200, but modulus values were somewhat higher in the former case (FIGS. 2 & 3). The properties such as elongation at break, modulus, and resilience indicate that 1,4-BD extended TPUs are more flexible than those extended with 1,3-PDO. It was found repeatedly that the resilience of PTMC TPUs increased with increase of hard segment concentration.

TABLE 7

Physico-Mechanical Properties of TPUs Based on PTMC 2000/1,4-BD/MDI

|  |  | SBM-22 | SBM-25 | SBM-28 | SBM-35 |
|---|---|---|---|---|---|
| Hardness | (Shore A) | 79 (32D) | 76 (31D) | 91 (42D) | 94 (58) |
| Properties at RT | | | | | |
| Tensile Strength | (psi) | 1974.00 | 1649.00 | 2919.00 | 5153.00 |
| Elongation | (%) | 624.50 | 601.70 | 578.70 | 502.20 |
| Young's Modulus | (psi) | 1533.00 | 708.60 | 4398.00 | 9745.00 |
| Stress (100% Strain) | (psi) | 448.40 | 312.00 | 771.40 | 1460.00 |
| Stress (300% Strain) | (psi) | 748.10 | 630.20 | 1331.00 | 2747.00 |
| Toughness | | 5551.00 | 4374.00 | 8488.00 | 13250.0 |

TABLE 7-continued

Physico-Mechanical Properties of TPUs Based on PTMC 2000/1,4-BD/MDI

|  |  | SBM-22 | SBM-25 | SBM-28 | SBM-35 |
|---|---|---|---|---|---|
| Other Properties at RT |  |  |  |  |  |
| Tear Resistance, Die C | (lbs/in) | 266.40 | 220.10 | 378.90 | 642.10 |
| Resilience | (%) | 4 | 12 | 13 | 24 |

EXAMPLE 6

In Example 6 the heat resistance of the elastomers was evaluated by measuring the stress-strain properties at 70° C. The retention of the tensile strength was found to be somewhat higher for PTMC 2000/1,3-PDO/MDI TPUs than for Desmophen C-200/1,3-PDO/MDI TPU (See FIG. 4). The elongation at break of PTMC 2000 increased significantly upon heating and the elasticity modulus decreased (See Table 5). The heat resistance of Desmophen C-200/1,4-BD/MDI TPUs was poor (See Table 8).

The coefficient of thermal expansion, as measured by TMA was found to be lower for PTMC TPUs than for Desmophen C-200 (See Table 9). The softening temperature of the TPUs as measured by TMA was in the range of 160 to 209° C. for PTMC 2000 and 160 to 175° C. for the corresponding Desmophen C-200 polyurethanes. The softening temperature of Desmophen C-200 was not affected significantly by the chain extender.

shifted about 10° C. when measured by DMA. The relatively high $T_g$ defines these polyurethanes more as elastoplastic materials with very good elasticity above room temperature. The glass transition temperature of Desmophen C-200 TPUs was about 30 degrees lower. An insight into the morphology was also obtained by FTIR spectroscopy. The FTIR spectra of the elastomers exhibited the bands typical for polycarbonate aromatic polyurethanes: —NH, (free and bonded) at 3300–3400 cm$^{-1}$; CH$_2$ at 2900–2970 cm$^{-1}$; C=O in carbonate and bonded urethane group at 1740–1759 cm$^{-1}$; C=O free urethane group at 1706 cm$^{-1}$; aromatic group at 1600 cm$^{-1}$ and —C—O—C— in ether group at 1033 cm$^{-1}$. The ratio of absorbance 1705 cm$^{-1}$/1745 cm$^{-1}$ increased with an increase of the hard segment concentration indicating probably an increase in the proportion of unbonded urethane groups. This ratio was found to be higher with the PTMC TPUs. The hydrogen bonds in

TABLE 8

Physico-Mechanical Properties of TPUs Based on Desmophen C-200//1,4-BD/MDI

|  |  | DBM-22 | DBM-25 | DBM-28 | DBM-35 |
|---|---|---|---|---|---|
| Hardness | (Shore A) | 64 | 71 | 77 | 80 |
| Properties at RT |  |  |  |  |  |
| Tensile Strength | (psi) | 3257.00 | 3677.00 | 5014.00 | 6361.00 |
| Elongation | (%) | 855.20 | 853.90 | 870.60 | 789.20 |
| Young's Modulus | (psi) | 920.10 | 1085.00 | 1252.00 | 1189.00 |
| Stress (100% Strain) | (psi) | 392.40 | 492.70 | 584.80 | 683.80 |
| Stress (300% Strain) | (psi) | 724.20 | 904.30 | 1135.00 | 856.90 |
| Toughness |  | 11250.00 | 13498.00 | 18587.00 | 23501.00 |
| Properties at 70° C. |  |  |  |  |  |
| Tensile Strength | (psi) | 30.74 | 1772.00 | 2734.00 | 392.40 |
| Elongation | (%) | 73.28 | 865.00 | 1039.00 | 121.30 |
| Young's Modulus | (psi) | 5658.00 | 721.00 | 880.50 | 2852.00 |
| Stress (100% Strain) | (psi) | — | 341.10 | 384.90 | 488.60 |
| Stress (300% Strain) | (psi) | — | 539.70 | 656.30 | — |
| Toughness |  | 29.54 | 7365.00 | 12940.00 | 433.50 |
| Other Properties at RT |  |  |  |  |  |
| Tear Resistance, Die C | (lbs/in) | 257.10 | 342.10 | 407.80 | 669.80 |
| Resilience | (%) | 54 | 42 | 42 | 33 |

• 4000 cycles, 500 gr, H22 Wheel

EXAMPLE 7

In Example 7 morphology was examined. The glass transition temperature of PTMC TPUs was about 0° C. and the polycarbonate polyurethanes are formed between urethane groups, and by bridging carbonate and urethane groups.

TABLE 9

Some Morphological Properties of TPUs

| | $T_g$ (DMA) (° C.) | $T_g$ (DSC) (° C.) | $T_m$ (TMA) (° C.) | Coef. Of Thermal Exp. (mm/m ° C.) |
|---|---|---|---|---|
| SPM-22 | 13.96 | −1.12 | 159.86 | 123.00 |
| SPM-25 | 9.88 | 0.36 | 201.97 | 87.20 |
| SPM-28 | 11.89 | 0.19 | 206.67 | 231.00 |
| SPM-35 | 9.71 | 2.88 | 208.64 | 149.00 |
| DPM-22 | −28.34 | −29.76 | 175.01 | 426.00 |
| DPM-25 | −30.00 | −31.54 | 161.10 | 281.00 |
| DPM-28 | −31.60 | −31.80 | 169.47 | 224.00 |
| DPM-35 | −28.53 | −30.32 | 162.02 | 219.00 |

EXAMPLE 8

In Example 8 the water resistance of the formulations with PDO/MDI was examined. The water resistance was evaluated by measuring the weight gain and change in stress-strain properties upon immersion in water at 70° C. for two weeks. The results are shown in Tables 10 and 11 and in FIG. 5. The weight gain of PTMC TPUs was 1.2 to 1.6%, and less (0.8 to 1%) for Desmophen C-200. These results correlate well with the change in tensile strength, which was 8 to 57% for PTMC 2000 (depending on the hard segment concentration) and 3.6 to 33.5% for Desmophen C-200. The better water resistance of Desmophen C-200 is due to the more hydrophobic structure (six —CH2 groups).

The relative transparency was measured by determining the light transmission (%) in the visible range of 474 to 630 nanometers. The degree of transparency decreased with increase of the hard segment concentration. PTMC 2000 TPUs exhibited significantly higher transparency at different hard segment concentrations as compared to Desmophen C-200. This could be due to the less ordered structure of PTMC backbone or the higher degree of phase mixing of flexible and hard segments.

TABLE 10

Effect of Immersion in Water at 70° C. (2 weeks) on the Properties of PTMC 2000/1,3 - PDO/MDI

| | | SPM-22 | SPM-25 | SPM-28 | SPM-35 |
|---|---|---|---|---|---|
| Original | | | | | |
| Tensile strength | (psi) | 3114.00 | 4355.00 | 5423.00 | 4216.00 |
| Elongation | (%) | 741.80 | 685.20 | 675.60 | 396.30 |
| Young's Modulus | (psi) | 836.80 | 1151.00 | 1272.00 | 1662.00 |
| Stress (100% Strain) | (psi) | 486.50 | 570.50 | 673.70 | 1235.00 |
| Stress (300% Strain) | (psi) | 1037.00 | 1334.00 | 1693.00 | 3196.00 |
| Toughness | | 10400.00 | 12110.00 | 15290.00 | 8659.00 |
| After two-week Immersion at 70° C. | | | | | |
| Tensile Strength | (psi) | 1342.00 | 2757.00 | 2986.00 | 4564.00 |
| (% Change) | | (−56.9) | (−36.7) | (−44.9) | (8.2) |
| Elongation | (%) | 572.70 | 712.90 | 625.60 | 541.70 |
| Young's Modulus | (psi) | 737.50 | 754.90 | 711.30 | 1156.00 |
| Stress (100% Strain) | (psi) | 353.70 | 428.30 | 503.50 | 917.70 |
| Stress (300% Strain) | (psi) | 712.90 | 958.90 | 1218.00 | 2202.00 |
| Toughness | (psi) | 4182.00 | 8820.00 | 8505.00 | 11590.00 |

TABLE 11

The Effect of Immersion in Water at 70° C. (2 weeks) on the Properties of Desmophen C-200/1,3 - PDO/MDI

| | | DPM-22 | DPM-25 | DPM-28 | DPM-35 |
|---|---|---|---|---|---|
| Original | | | | | |
| Tensile Strength | (psi) | 2402.00 | 4009.00 | 3165.00 | 4870.00 |
| Elongation | (%) | 939.00 | 1124.00 | 910.10 | 730.80 |
| Young's Modulus | (psi) | 652.50 | 837.90 | 1202.00 | 1669.00 |
| Stress (100% Strain) | (psi) | 338.50 | 394.70 | 500.40 | 862.00 |
| Stress (300% Strain) | (psi) | 572.80 | 684.90 | 874.60 | 1772.00 |
| Toughness | | 10340.00 | 17540.00 | 13050.00 | 18640.00 |
| After two-week Immersion at 70° C. | | | | | |
| Tensile Strength | (psi) | 2527.00 | 2664.00 | 3051.00 | 5370.00 |
| (% Change) | | (5.2) | (−33.5) | (−3.6) | (10.2) |
| Elongation | (%) | 1070.00 | 1065.00 | 968.40 | 805.80 |
| Young's Modulus | (psi) | 460.60 | 664.10 | 915.80 | 1217.00 |
| Stress (100% Strain) | (psi) | 257.50 | 301.30 | 398.40 | 711.00 |
| Stress (300% Strain) | (psi) | 450.70 | 581.60 | 773.10 | 1422.00 |
| Toughness | (psi) | 10320.00 | 12100.00 | 13110.00 | 18060.00 |

EXAMPLE 9

In Example 9 the chemical resistance of TPUs was measured in various media including oil (100% neutral paraffinic oil), Fisher Brand 19, ethylene glycol, dilute acids (10% H2SO4 and 10% HCl) and sodium hydroxide. Results are shown in Table 12. The weight gain in hydraulic oil was low while in inorganic acids, it was higher, especially with PTMC TPUs. The weight gain in sodium hydroxide was relatively low except for Desmophen C-200 at 35% hard segment concentration. Unexpectedly, the weight gain in ethylene glycol was much lower with PTMC than with Desmophen C-200 TPUs. Overall the resistance of TPU in this media was good. For reference the resistance of TPUs based on poly(oxytetramethylene) glycols is shown in Table 12-A.

TABLE 12

Chemical Resistance after One-week Immersion at Room Temperature

| | Oil | Ethylene Glycol | HCl 10% | $H_2SO_4$ 10% | NaOH 10% |
|---|---|---|---|---|---|
| | | Weight Change (%) | | | |
| DPM TPUs* | 0.0–0.32 | 1.00–1.26 | 0.22–0.83 | 0.14–0.53 | 0.0–1.10 |
| DBM TPUs* | 0.0–0.28 | 0.90–0.92 | 0.22–0.44 | 0.00–0.58 | 0.35–0.48 |
| SPM TPUs* | 0.15–0.31 | 0.39–0.63 | 0.80–1.51 | 0.66–1.52 | 0.00–0.58 |

*Hard Segment Concentration was varied from 22 to 35%.

TABLE 12-A

Resistance after One-Week Immersion of TPUs Based on POTMG 1000/1,4 - BD/MDI, 35% Hard Segment Concentration*

| | Weight Increase (%) |
|---|---|
| $H_2SO_4$, 30% | 1.1 |
| NaOH 10% | 1.6 |
| Ethylene Glycol | 41.4 |
| Oil | 3.1 |

*Reactivity Studies and Cast Elastomers Based on Trans-cyclohexane-1,4-Diisocyanate and 1,4-Phenylene Diisocyanate, S. W. Wong and K. C. Frisch, Advances in Urethane Science and Technology, Vol. 8, page 74 (1981).

EXAMPLE 10

In Example 10 TPUs based on the cycloaliphatic diisocyanate $H_{12}MDI$ and PTMC 2000 were cured. The curing conditions are shown in Tables 13 and 14. In the designations in the first row of each table, SPH-25 to SPH-35 corresponds to PTMC2000/1,3-PDO/$H_{12}MDI$ with the hard segment concentration from 25 to 35%. SBH-25 to SBH-35 corresponds to PTMC2000/1,4-BD/$H_{12}MDI$ with the hard segment concentration from 25 to 35%.

The tensile strength, which increased with hard segment concentrations, exhibited moderate values, somewhat higher with 1,3-PDO than with 1,4-BD chain extender. PTMC 2000 TPUs exhibited better properties with 1,3-PDO than with 1,4-BD chain extender, with both MDI and $H_{12}MDI$. It could be noted that $H_{12}MDI$ TPUs were cured at lower temperatures than MDI TPUs, due to their lower green strength.

The glass transition temperature was determined by differential scanning calorimetry and dynamic-mechanical method. The DSC glass transition temperature of $H_{12}MDI$ TPUs was somewhat below 0° C., lower than that of MDI based TPUs, indicating less interaction of the flexible segment with $H_{12}MDI$. The softening temperature of $H_{12}MDI$ was typically in the range of 175 to 193° C. 1,3-PDO extended TPUs were transparent at 25% hard segment concentration and translucent at 28 to 35% hard segment concentrations. 1,4-BD extended TPUs were translucent at 25% hard segment and hazy at higher hard segment concentration. As a reference some properties of TPUs based on $H_{12}MDI$/PTMO2000/1,4-BD are shown in Table 13-A.

The weight change of SPH-TPUs upon immersion in water at 70° C. for two weeks was 1.2 to 1.73%, similar to MDI-TPUs (See Table 15).

The resistance of $H_{12}MDI$-TPUs in hydraulic oil, ethylene glycol, 10% HCl, 10% $H_2SO_4$, and 10% NaOH, as measured by the weight gain is shown in Table 16. The resistance to oil was excellent (no weight increase). The weight gain in acid, sodium hydroxide and especially in ethylene glycol was higher.

TABLE 13

The Formulation and Properties of TPUs Based on PTMC 2000/1,4 - BD/$H_{12}$MDI

| | | SBH-25 | SBH-28 | SBH-30 | SBH-35 |
|---|---|---|---|---|---|
| Formulation | | | | | |
| PTMC | (gr) | 29.23 | 27.97 | 27.14 | 24.46 |
| 1,4 - BD | (gr) | 1.06 | 1.96 | 2.20 | 2.73 |
| $H_{12}$ MDI | (gr) | 9.16 | 10.05 | 10.64 | 12.79 |
| T-12 | (% wt) | 0.0065 | 0.0075 | 0.0075 | 0.0075 |
| Processing | | | | | |
| Mixing Temp. | (°C.) | 135 | 135 | 135 | 135 |
| Mold Curing | (° C./hour) | 135/1 | 135/1 | 135/1 | 135/1 |
| Post Curing | (° C./hour) | 85/24 | 85/24 | 85/24 | 85/24 |
| Hard Segment Conc. | (%) | 25 | 28 | 30 | 35 |
| Hardness | (Shore) | 68 | 84 | 86 | 88 |
| Properties at RT | | | | | |
| Tensile Strength | (psi) | 660.50 | 1706.00 | 3405.00 | 1371.00 |
| Elongation | (%) | 751.60 | 435.00 | 433.70 | 336.10 |
| Young's Modulus | (psi) | 985.10 | 2545.00 | 3892.00 | 982.60 |
| Stress (100% Strain) | (psi) | 275.10 | 282.30 | 1075.00 | 46.30 |
| Stress (300% Strain) | (psi) | 425.50 | 697.00 | 2189.00 | — |
| Tear Resistance, Die C | (lbs/in) | 244.10 | 301.10 | 402.80 | 364.60 |

TABLE 13-continued

The Formulation and Properties of TPUs Based on PTMC 2000/1,4 - BD/H$_{12}$MDI

|  |  | SBH-25 | SBH-28 | SBH-30 | SBH-35 |
|---|---|---|---|---|---|
| Thermal Properties |  |  |  |  |  |
| T$_g$ (DMA) | (° C.) | 5.06 | 3.61 | 5.24 | 7.89 |
| T$_g$ (DSC) | (° C.) | −4.37 | −6.26 | −6.13 | −3.29 |
| T$_m$ (TMA) | (° C.) | 96.22 | 193.03 | 184.00 | 180.47 |
| Coef. Of Thermal Expansion | (μm/m ° C.) | 161.00 | −44.00 | −426.00 | 247.00 |
| Appearance |  | Transl. | Hazy | Hazy | Hazy |

TABLE 13-A

Properties of TPUs Based on PTMO/1,4-BD/H$_{12}$MDI*

|  |  | I - 1.0 | I - 1.5 | I - 2.0 |
|---|---|---|---|---|
| Hard Segment | (%) | 24.9 | 29.7 | 34.2 |
| Hardness | (Shore) | 65 | 74 | 79 |
| Properties at RT |  |  |  |  |
| Tensile Strength | (psi) | 4106.00 | 4046.00 | 3164.00 |
| Elongation | (%) | 1146.00 | 1058.00 | 873.00 |
| Young's Modulus | (psi) | 574.00 | 712.00 | 970.00 |

*Structure-Property Relationships of Transparent Aliphatic Polyurethane Elastomers from the Geometric Isomers of Methylene Bis(4-Cyclohexyl Isocyanate), S. Wong, K. C. Frisch, C. A. Byrne, D. P. Mack, and N. S. Schneider, Advances in Urethane Science and Technology, Vol. 9, page 77, 1984.

TABLE 15

Weight change after Two-Week Immersion in Water at 70° C.

|  | Initial Weight (gr) | Final Weight (gr) | Weight Change (%) |
|---|---|---|---|
| SPH-25 | 0.1860 | 0.1882 | 1.20 |
| SPH-28 | 0.1305 | 0.1327 | 1.72 |
| SPH-30 | 0.1925 | 0.1952 | 1.42 |
| SPH-35 | 0.2025 | 0.2087 | 1.73 |

TABLE 14

The Formulation and Properties of TPUs Based on PTMC 2000/1,3-PDO/H$_{12}$MDI

|  |  | SPH-25 | SPH-28 | SPH-30 | SPH-35 |
|---|---|---|---|---|---|
| Formulation |  |  |  |  |  |
| PTMC 2000 | (gr) | 29.92 | 30.00 | 28.80 | 26.00 |
| 1,3 - PDO | (gr) | 1.25 | 1.61 | 1.96 | 2.78 |
| H$_{12}$ MDI | (gr) | 8.81 | 10.29 | 10.91 | 12.45 |
| T-12 | (% wt) | 0.008 | 0.008 | 0.008 | 0.008 |
| Processing |  |  |  |  |  |
| Mixing Temp. | (° C.) | 135 | 135 | 135 | 135 |
| Mold Curing | (° C./hour) | 135/1 | 135/1 | 135/1 | 135/1 |
| Post Curing | (° C./hour) | 100/24 | 90/24 | 90/24 | 100/24 |
| Hard Segment Conc. | (%) | 25 | 28 | 30 | 35 |
| Hardness | (Shore) | 68 | 75 | 78 | 89 |
| Properties at RT |  |  |  |  |  |
| Tensile Strength | (psi) | 1889.00 | 2830.00 | 3088.00 | 3008.00 |
| Elongation | (%) | 603.30 | 455.10 | 448.70 | 294.20 |
| Young's Modulus | (psi) | 1075.00 | 1258.00 | 1601.00 | 5907.00 |
| Stress (100% Strain) | (psi) | 459.00 | 701.00 | 885.80 | 1401.00 |
| Stress (300% Strain) | (psi) | 835.00 | 1693.00 | 1912.00 | — |
| Tear Resistance, Die C | (lbs/in) | 288.10 | 331.60 | 355.30 | 474.20 |
| Thermal Properties |  |  |  |  |  |
| T$_g$ (DMA) | (° C.) | 9.20 | 10.72 | 10.78 | 7.34 |
| T$_g$ (DSC) | (° C.) | 0.88 | −0.87 | −3.84 | −1.85 |
| T$_m$ (TMA) | (° C.) | 181.42 | 185.81 | 174.96 | 179.09 |
| Coef. Of Thermal Expansion | (μm/m ° C.) | −44.80 | 100.00 | 210.00 | 139.00 |
| Appearance |  | Transp. | Transl. | Transl. | Transl. |

TABLE 16

Chemical Resistance after One-Week Immersion at Room Temperature

|  | Oil | Ethylene Glycol | HCl 10% | H$_2$SO$_4$ 10% | NaOH 10% |
|---|---|---|---|---|---|
|  |  | Weight Change (%) |  |  |  |
| SPH TPUs* | 0.0 | 1.20–2.30 | 1.26–2.00 | 1.20–1.70 | 1.26–2.35 |
| SPH TPUs* | 0.0 | 2.30–3.33 | 0.70–1.00 | 0.80–1.00 | 0.86–1.00 |

*Hard Segment Concentration was varied from 25 to 35%.

TABLE 17

The Effect of Hard Segment Concentration on the Hardness of TPUs Based on PTMG 2000*

|  | 2PTMG20 | 3PTMG20 |
|---|---|---|
| Hard Segment Concentration (%) Hardness | 22 | 33 |
| Shore A | 70 | 85 |
| Shore D | 33 | 38 |

*M. Vlajic, E. Torlic, A. Sendijarevic, and V. Sendijarevic, Polimeri, Vol. 10(3), pages 62–66, 1989.

TABLE 18

The Effect of Hard Segment Concentration on the Hardness of TPUs Based on CPL 2000*

|  | 2CLP20 | 3CLP20 | 4CLP20 |
|---|---|---|---|
| Hard Segment Conc. (%) Hardness | 22 | 32 | 39 |
| Shore A | 72 | 82 | 89 |
| Shore D | 33 | 39 | 44 |

*M. Vlajic, E. Torlic, A. Sendijarevic, and V. Sendijarevic, Polimeri, Vol. 10(3), pages 62–66, 1989.

We claim:

1. A thermoplastic polyurethane elastomer (TPU) composition which consists essentially of:
   a) A poly(trimethylene carbonate) diol (PTMC diol) as the soft segment wherein the poly(trimethylene carbonate) diol is produced by reacting trimethylene carbonate with a polyhydric alcohol in the presence of a catalyst at a temperature in the range of 50–160° C.;
   b) A diisocyanate; and
   c) At least one glycol which reacts with the diisocyanate to form the hard segment which comprises from 10% to 55% by weight of the composition wherein the hard segment is defined as the sum portion of diisocyanate that reacts with the glycol plus the unreacted glycol.

2. The composition of claim 1 wherein the number average molecular weight of the poly(trimethylene carbonate) diol is from about 300 to 6000.

3. The composition of claim 2 wherein the number average molecular weight of the poly(trimethylene carbonate) diol is from about 1000 to 3000.

4. The composition of claim 1 wherein the functionality of the polyl(trimethylene carbonate) is about two.

5. The composition of claim 1 wherein the hard segment is present in an amount of 10 to 50% by weight of the composition.

6. The composition of claim 5 wherein the hard segment is present in an amount of 20 to 40% by weight of the composition.

7. The composition of claim 1 wherein the glycol in the hard segment is selected from the group consisting of aliphatic, alicyclic, aralkyl, and aromatic glycols.

8. The composition of claim 7 wherein the glycol is selected from ethylene glycol; propylene glycol; 1,3-propanediol; 2, methyl-1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; and p-xylylenediol, or mixtures thereof.

9. The composition of claim 8 wherein the glycol is selected from the group consisting of 1,3-propanediol and 1,4-butanediol, and mixtures thereof.

10. The composition of claim 1 wherein the diisocyanate is selected from aromatic, aliphatic, or cycloaliphatic diisocyanates.

11. The composition of claim 10 wherein the diisocyanate is selected from the group consisting of hexamethylene diisocyanate, isophorone diisocyanate, 1,4-cyclohexane diisocyanate, 1-methyl-2,4- and -2,6-cyclohexane diisocyanate, 2,4-toluene diisocyanate, 4,4'-, 2,4'- and 2,2'-diphenylmethane diisocyanate, urethane-modified liquid 4,4'- and/or 2,4'-diphenylmethane diisocyanates, 4,4'-diisocyanatodiphenylethane-(1,2) and 1,5-naphthalene diisocyanate, diphenylene-4-4'-diisocyanate, 3,3'-dimethoxy-4-4'-diphenylene diisocyanate, methylene-bis-(4-cyclohexylisocyanate), tetramethylene diisocyanate, decamethylene diisocyanate, ethylene diisocyanate, ethylidene diisocyanate, propylene-1,2-diisocyanate, cyclohexylene-1,2-diisocyanate, m-phenylene diisocyanate, p-phenylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, furfurylidene diisocyanate, xylylene diisocyanate, diphenyl propane-4,4'-diisocyanate, bis-(2-isocyanatoethyl) fumarate, naphthalene diisocyanate, 1,4'-dicyclohexylmethane diisocyanate, 3-isocyanatomethyl-3,5,5-trimethylcyclohexyl isocyanate, cyclohexylene-1,4-diisocyanate, 4,4-methylenebis(phenyl isocyanate), 2,2-diphenylpropane-4,4'-diisocyanate, p-phenylene diisocyanate, m-phenylene diisocyanate, xylene diisocyanate, 1,4-naphthalene diisocyanate, 4,4'-diphenyl diisocyanate, azobenzene-4,4'-diisocyanate, m- or p-tetramethylxylene diisocyanate and 1-chlorobenzene-2,4-diisocyanate, 1,6-hexamethylene diisocyanate, 4,6'-xylylene diisocyanate, 2,2,4-(2,4,4-)trimethylhexamethylene diisocyanate, 3,3'-dimethyldiphenyl 4,4'-diisocyanate, 3,3'-dimethyl-diphenylmethane 4,4'-diisocyanate, and combinations thereof.

12. The composition of claim 11 wherein the isocyanate is selected from the group consisting of 4,4'-diphenylmethane diisocyanate (MDI) and methylene-bis(4-cyclohexyl isocyanate) (H12MDI).

13. The composition of claim 1 wherein a catalyst is employed and is selected from the group consisting of tertiary amine urethane catalysts and organic metal catalysts.

14. The composition of claim 13 wherein the catalyst is a tertiary amine urethane catalyst which is selected from the group consisting of triethylamine, dimethylcyclohexylamine, N-methylmorpholine, N,N'-dimethylpiperazine, 2-(dimethylaminoethoxy)ethanol, diazabicyclo(2,2,2)octane, and mixtures thereof.

15. The composition of claim 13 wherein the catalyst is an organic metal catalyst selected from the group consisting of titanic acid esters, iron compounds and tin compounds.

16. The composition of claim 15 wherein the catalyst is selected from the group consisting of tin diacetate, tin dioctoate, tin dilaurate, and the tin dialkyl salts of aliphatic carboxylic acids.

17. The composition of claim 16 wherein the tin dialkyl salts of aliphatic carboxylic acid are selected from the group consisting of dibutyltin diacetate, dibutyltin dilaurate, or mixtures thereof.

18. The composition of claim 1 wherein the polyol and chain extender are preheated at 80 to 160° C. and the isocyanate is separately preheated to a temperature in the same range.

19. The composition of claim 1 wherein the PTMC diol is prepared by reacting trimethylene carbonate, a catalyst, and one or more alcohols, under nitrogen.

20. The composition of claim 19 wherein said alcohols are selected from the group consisting of one or more polyhydric alcohols.

21. The composition of claim 19 wherein the reaction takes place at a temperature from 50 to 160° C.

22. The composition of claim 19 wherein the catalyst is selected from the group consisting of a salt of an element from Group IA or IIA of the Periodic Table.

23. The composition of claim 20 wherein said polyhydric alcohol is selected from the group consisting of diols, triols, and higher functionality polyhydric alcohols.

24. The composition of claim 23 wherein the polyhydric alcohol is selected from the group consisting of propanediol, trimethylol propane, and mixtures thereof.

25. The composition of claim 22 wherein the catalyst is sodium acetate.

26. The composition of claim 21 wherein the temperature is from 100 to 150° C.

* * * * *